US008965906B1

(12) United States Patent
Werth

(10) Patent No.: US 8,965,906 B1
(45) Date of Patent: Feb. 24, 2015

(54) GEOGRAPHIC DATA STRUCTURING AND ANALYSIS

(75) Inventor: Matthew William Werth, Gainesville, VA (US)

(73) Assignee: Leidos, Inc., Reston, VA (US)

(*) Notice: Subject to any disclaimer, the term of this patent is extended or adjusted under 35 U.S.C. 154(b) by 201 days.

(21) Appl. No.: 13/435,710

(22) Filed: Mar. 30, 2012

Related U.S. Application Data

(60) Provisional application No. 61/516,228, filed on Mar. 31, 2011.

(51) Int. Cl.
*G06F 7/00* (2006.01)
*G06F 17/30* (2006.01)

(52) U.S. Cl.
USPC .......................... 707/752; 707/724; 707/795

(58) Field of Classification Search
USPC ........................................ 707/724, 752, 795
See application file for complete search history.

(56) References Cited

U.S. PATENT DOCUMENTS

| | | | | |
|---|---|---|---|---|
| 7,698,336 | B2* | 4/2010 | Nath | 707/737 |
| 8,442,963 | B2* | 5/2013 | Irish et al. | 707/705 |
| 2005/0091223 | A1* | 4/2005 | Shaw et al. | 707/100 |
| 2009/0019081 | A1* | 1/2009 | Safra et al. | 707/103 R |
| 2009/0228451 | A1* | 9/2009 | Ko | 707/3 |
| 2010/0049704 | A1* | 2/2010 | Sumiya | 707/5 |
| 2010/0145936 | A1* | 6/2010 | Grinstein et al. | 707/724 |
| 2013/0041903 | A1* | 2/2013 | Lindley et al. | 707/740 |

OTHER PUBLICATIONS

"ArcGIS" [online], Wikipedia, [retrieved on May 15, 2012], 9 pp., Retrieved From the Internet: http://en.wikipedia.org/wiki/ArcGIS.
SAIC, "GeoRover® Software Products, Customer Focused GIS Tools That Delivery," Copyright 2011, 5 pp.
GIS by ESRI, "What is ArcGIS?," Copyright 2001, 2002 ESRI, 80 pp.

* cited by examiner

*Primary Examiner* — Sherief Badawi
*Assistant Examiner* — Christopher J Raab
(74) *Attorney, Agent, or Firm* — Dawn-Marie Bey; Bey & Corporation PLLC

(57) ABSTRACT

Geographic data structuring and analysis is described. In one embodiment, a method for geographic data structuring and analysis is described, including parsing a set of geographic objects into groups of geographic objects, and assigning one or more attributes to the parsed geographic objects. The method may further include accessing a database of geographic object feature data and assigning certain features to certain attributes of the geographic objects, rendering one or more of the geographic objects in relation to geospatial topology information, and analyzing the rendered geographic objects. In certain aspects, systems and methods described herein provide functions attributable to Geographic Information Systems using rendering processors and engines that would otherwise be unable to achieve such functions.

8 Claims, 12 Drawing Sheets

GEOGRAPHIC DATA STRUCTURING AND ANALYSIS

CROSS-REFERENCE TO RELATED APPLICATION

This application claims the benefit of U.S. Provisional Application No. 61/516,228, filed Mar. 31, 2011, the entire contents of which are hereby incorporated herein by reference.

TECHNICAL FIELD

Embodiments described herein generally relate to a system and method for geographic data structuring and analysis and, more particularly, to a system and method for enabling Geographic Information System (GIS) functionality on a rendering processor or engine such as Google Earth by managing data outside the rendering processor and utilizing a live push to drive the rendering processor.

BACKGROUND

A Geographic Information System (GIS) provides the capability to capture, store, analyze, manage, and present data associated with geographic object items and attributes of the geographic object items in relation to a geospatial topology database, typically via a geospatial mapping interface. Some mapping applications, such as Google Earth, allow for quick access to geographic object items in relation to a geospatial topology database—but without a structured format for geographic object items. That is, Google Earth provides the capability to present geographic object items in relation to a geospatial topology database, but with a different approach than a GIS. For example, geographic object items are typically loaded into Google Earth through a Keyhole Markup Language (KML) format file. KML files contain data in a generally unstructured and free form. In KML, many types of geographic object items or features (i.e., points, lines, polygons, images, tours, etc.) are mixed together among one or more folders. As understood in the art, the organization of geographic object items in KML files is limited. In this case, the unstructured nature of the KML format limits the ability of a user to perform analysis, editing, and spatial display and representation.

Thus, when a user interacts with a mapping application operating with geographic object items in an unstructured form, the user may not be able to easily select all geographic object items of the same type, for example, to analyze them. Similarly, when interacting with an unstructured mapping application, the user may be required to update attributes of a plurality of geographic object items of the same type individually, rather than simultaneously as a group. Further, the user may not be able to add a new attribute to the plurality of geographic object items easily. In the context of these examples, the limitations of unstructured mapping applications is apparent. Accordingly, there is a need in art to convert unstructured geographic object item data into structured formats to facilitate follow-on analysis. Embodiments described herein are directed to addressing the deficiencies of and achieving improvements over the above-discussed unstructured mapping systems.

SUMMARY OF THE INVENTION

In one embodiment, a method for geographic data structuring and analysis is described, including accessing a set of geographic objects and storing the set of geographic objects into a memory, and parsing, by a parsing engine, the set of geographic objects into groups of geographic objects. The method may further include assigning one or more attributes to the parsed geographic objects, accessing a database of geographic object feature data and assigning certain features of the geographic object feature data to certain attributes of the geographic objects, rendering one or more of the geographic objects in relation to geospatial topology information, and analyzing the rendered geographic objects based on at least one attribute of the geographic objects.

In one aspect of the method for geographic data structuring and analysis, assigning one or more attributes includes, for each group of geographic objects, assigning a same set of attributes to each geographic object of the group of geographic objects. The method for geographic data structuring and analysis may further include adding a new geographic object to a group of the geographic objects, the new geographic object inheriting the same attributes assigned to each geographic object of the group of geographic objects, and displaying a dialog box for editing a value of an attribute of the geographic objects.

In other aspects of the method for geographic data structuring and analysis, parsing the set of geographic objects includes defining a current folder, analyzing object items in the current folder, when each object item in the current folder has been analyzed, determining whether the current folder is a sub-folder, and, when the current folder is a sub-folder, setting a parent folder as a current folder. Further, in certain aspects, analyzing the object items in the current folder includes identifying a feature type of the next object item in the current folder, determining a schema of the next object item in the current folder, determining whether a combination of the feature type and schema of the next object item is a new for the current folder, and placing the next object item a folder based on whether the combination of the feature type and schema of the next object item is new. Still further, in certain aspects, determining a schema of the next object item in the current folder includes determining each style of the next object item, and defining the schema of the next object item to include a combination of each style of the next object item.

In another embodiment, a system for geographic data structuring and analysis is described, including a geographic data structuring processor configured to access a set of geographic objects and store the set of geographic objects into a memory, parse the set of geographic objects into groups of geographic objects. The geographic data structuring processor may be further configured to assign one or more attributes to the parsed geographic objects, and access a database of geographic object feature data and assign certain features of the geographic object feature data to certain attributes of the geographic objects. The system further includes a geographic data rendering processor configured to render one or more of the geographic objects in relation to geospatial topology information.

In one aspect, the geographic data structuring processor is further configured to analyze the rendered geographic objects based on at least one attribute of the geographic objects. In other aspects, the geographic data structuring processor is further configured to, for each group of geographic objects, assign a same set of attributes to each geographic object of the group of geographic objects. In certain embodiments, the geographic data structuring processor is further configured to add a new geographic object to a group of the geographic objects, the new geographic object inheriting the same attributes assigned to each geographic object of the group of geographic objects. Further, in certain aspects, the geographic data structuring processor is further configured to display a dialog box for editing a value of an attribute of the geographic objects.

In another aspect, the geographic data structuring processor is further configured to sort the rendered geographic object items according to respective values of an attribute of each of the rendered geographic objects. Further, in certain aspects, the geographic data structuring processor is further configured to query the rendered geographic object items based on the attributes of the rendered geographic object items.

In another embodiment, a computer readable storage device storing computer readable instructions thereon that, when executed by a processor, direct the processor to perform a method for geographic data structuring and analysis is described, the method including accessing a set of geographic objects and storing the set of geographic objects into a memory, and parsing, by the processor, the set of geographic objects into groups of geographic objects. The method may further include assigning one or more attributes to the parsed geographic objects, accessing a database of geographic object feature data and assigning certain features of the geographic object feature data to certain attributes of the geographic objects, rendering one or more of the geographic objects in relation to geospatial topology information, and analyzing the rendered geographic objects based on at least one attribute of the geographic objects.

BRIEF DESCRIPTION OF THE DRAWINGS

For a more complete understanding of the embodiments described herein and the advantages thereof, reference is now made to the following description, in conjunction with the accompanying figures briefly described as follows.

DETAILED DESCRIPTION

In the following paragraphs, embodiments are described in further detail by way of example with reference to the attached drawings. In the description, well known components, methods, and/or processing techniques are omitted or briefly described so as not to obscure certain aspects of the various embodiments. Among the embodiments, some aspects and features are implemented by a computer program executed by one or more processors, as described and illustrated. As would be apparent to one having ordinary skill in the art, the embodiments described herein may be implemented, at least in part, by computer-readable instructions in various forms, and the various embodiments are not intended to be limiting to a particular set or sequence of instructions executed by the processor.

Turning to the drawings, in which like numerals indicate like, but not necessarily the same, elements throughout, exemplary embodiments are described in detail.

Figure 1:
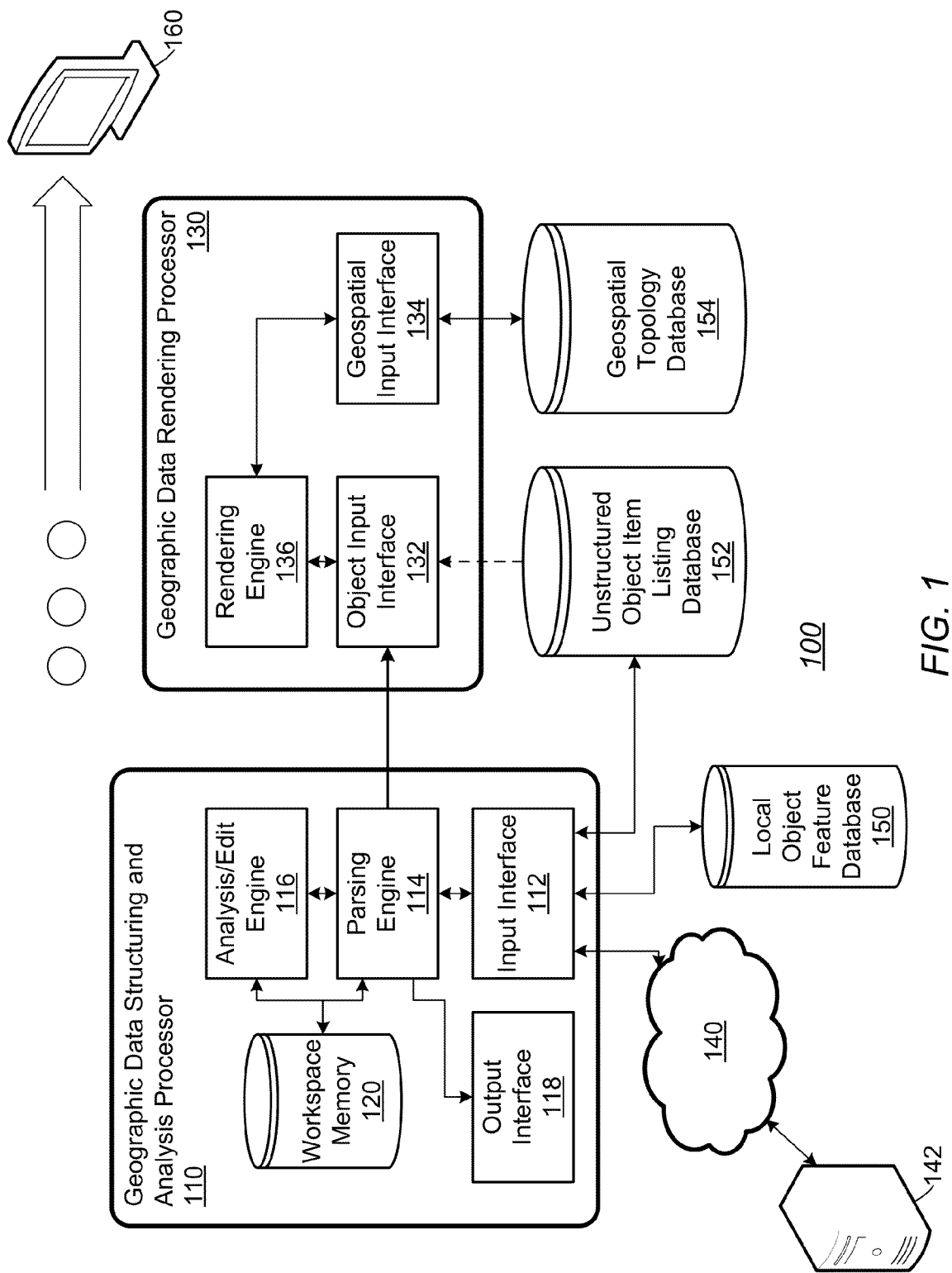
FIG. 1 illustrates an example embodiment of a system for geographic data structuring and analysis.

FIG. 1 illustrates an example embodiment of a system 100 for geographic data structuring and analysis. The system 100 comprises a geographic data structuring and analysis processor (the "analysis processor") 110 and a geographic data rendering processor (the "rendering processor") 130. The system 100 also comprises a data network 140 coupled to a third party object feature server database 142, a local object feature database 150, an unstructured object item listing database 152, and a geospatial topology database 154. In one embodiment, the analysis processor 110 comprises an input interface 112, a parsing engine 114, an analysis/edit engine 116, an output interface 118, and a workspace memory 120. Also, in one embodiment, the rendering processor 130 comprises an object input interface 132, a geospatial input interface 134, and a rendering engine 136. In certain aspects, the output of the system 100 may be presented on a general purpose display 160, as understood in the art.

In operation, the rendering processor 130 is configured to render geographic object items in relation to geospatial topology information as part of a mapping application. That is, based on the processing conducted by the rendering processor 130, a display of objects or items may be provided on the display 160 in relation to geospatial topology. In this context, the rendering processor 130 comprises a component of a larger overall GIS system that permits a user of the system to visualize objects or items in relation to geospatial topology. In other words, for example, the rendering processor 130 presents data with reference to an underlying map. Thus, a user is able to visualize aspects of the data which may not be readily apparent without the underlying map, such as respective positions of geographic object items in relation to each other or to certain landmarks, for example. In certain embodiments and aspects, the rendering processor 130 may be implemented, at least in part, by a rendering processor or engine such as Google Earth.

To provide the rendered output to the display 160, the geospatial input interface 134 of the rendering processor 130 is configured to access the geospatial topology database 154 and provide geospatial topology data to the rendering engine 136. Further, the object input interface 132 is configured to access or receive geographic object items and provide the geographic object items to the rendering engine 136 for rendering in relation to the geospatial topology data. In one embodiment, the object input interface 132 comprises an Application Programming Interface (API), although the object input interface 132 may comprise other types of interfaces. The rendering engine 136 is configured to render the geographic object items accessed by the object input interface 132 from the unstructured object item listing database 152 in relation to the geospatial topology data from the geospatial input interface 134. The rendering engine 136 is further configured to provide the rendered output to the display 160.

In various embodiments, the geospatial topology database 154 comprises a database of information related to the features of a geographic region or regions. The geospatial topology database 154 may store geospatial topology information in various forms. In one embodiment, the geospatial topology database 154 stores data as a set of points, lines, and polygons in vector or scalar form and/or as a set of photographs or bitmaps of overlay data, for example, without limitation. In general, the geospatial topology information may be stored in association with a geographic coordinate system, so that geographic object items having geographic coordinates may be rendered in relation to the coordinate system. In certain embodiments, using the geospatial topology information stored in the geospatial topology database 154, the rendering engine 136 may render a graphical representation of the planet earth including topology features such as land, oceans, lakes, rivers, and mountains, among other features as would be understood in the art, without limitation.

The unstructured object item listing database 152 comprises a database of geographic object items. In general, the database of geographic object items comprises object items to be analyzed in relation to geospatial topology information, such as that stored in the geospatial topology database 154. As one example, each geographic object item may comprise a point, line, or polygon associated with coordinates indicating where such item should be rendered with respect to the geospatial topology information. To facilitate this rendering, the database of geographic object items 152 and the geospatial topology database 154 may both rely upon a common coordinate system.

As an example for further context, object items stored in the unstructured object item listing database 152 may be associated with particular elements of a utility or service system, such as water meters, utility poles, or traffic lights. In this context, data may be displayed on the display 160 in relation to the geospatial topology information stored in the geospatial topology database 154 by the rendering processor 130, to provide a user with a geospatial representation of all water meters of a municipality, for example. The display of geographic object items other than points, lines, and polygons are within the scope of this disclosure, as noted by the further examples below, without limitation.

It is noted that, if the object input interface 132 directly accesses the geographic object items from the unstructured object item listing database 152 (as indicated by the dashed line in FIG. 1), the object items are provided to the rendering engine 136 individually and generally without any structure or associations among them, because the unstructured object item listing database 152 stores geographic object items without (or nearly without) any formatting, structure, or associations to assist with analysis or editing. In certain embodiments, the unstructured object item listing database 152 may store geographic object items in an unstructured KML file. In this case, when the rendering processor 130 displays the geographic object items in relation to the geospatial topology information on the display 160, a user is limited in his ability to analyze and edit the information presented by the display 160. In other words, the user may be limited to selecting geographic object items individually and unable to update attributes of more than one object item at a time, even for groups of object items of similar feature type.

Figure 2:
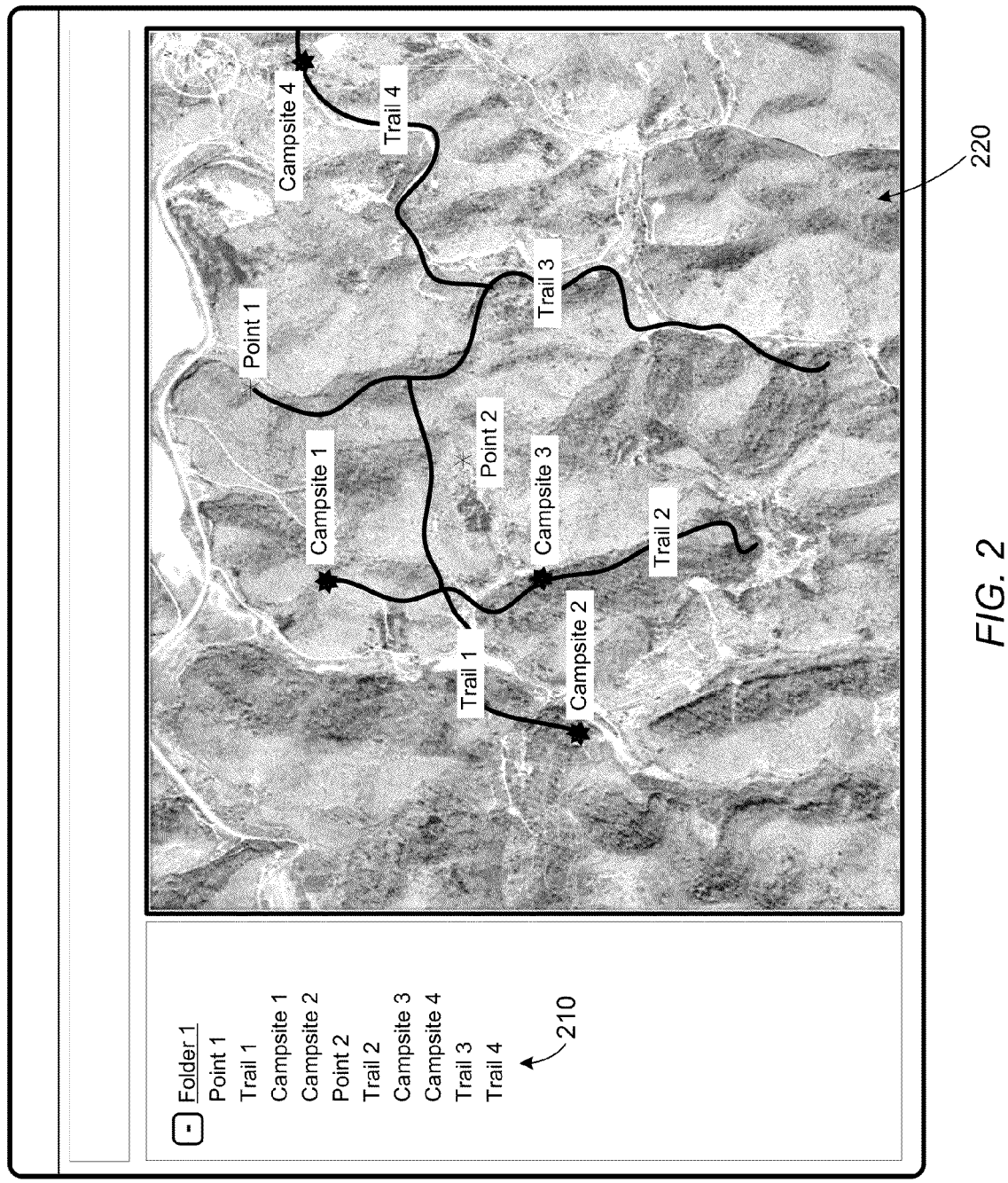
FIG. 2 illustrates an example display of geographic object items rendered in relation to geospatial topology information.

Turning to FIG. 2, an example illustration of a display of geographic object items rendered in relation to geospatial topology information is described. In FIG. 2, unstructured geographic object items 210 are rendered in relation to geospatial topology information 220. Particularly, in the example of FIG. 2, the geographic object items 210 include points, trails, and campsites. Based on coordinate information associated with each of the geographic object items 210, the items are displayed at positions relative to each other and to the geospatial topology information 220. As illustrated, the geographic object items 210 are unorganized except for being maintained within a single folder, "Folder 1," as compared to the illustration of FIG. 3, described below. In the example of FIG. 2, it is noted that a user is unable to select all points, trails, or campsites easily. Similarly, the user is unable to easily distinguish among features of the trails such as trail distance, for example. Instead, the user may be required to select and analyze each trail individually if attempting to determine which trail is the longest or shortest. Thus, although the geographic object items 210 are rendered in relation to the geospatial topology information 220, the user may be unable to perform a suitable analysis on the geographic object items 210 in a quick, flexible, and effective manner.

Returning to FIG. 1, the operation of the analysis processor 110 is described in further detail. The input interface 112 accesses the geographic object items from the unstructured object item listing database 152 and provides them to the parsing engine 114 and/or the workspace memory 120. In one embodiment, the input interface 112 comprises an Application Programming Interface (API), although the input interface 112 may comprise other types of interfaces. As described in additional detail below, the parsing engine 114 parses and organizes the geographic object items from the unstructured object item listing database 152 into groups, layers, or other associations based on one or more of feature type, attribute schema, geographic proximity, or other properties, for example, without limitation. In this context, the memory 120 comprises a workspace memory for the parsing engine 114, when parsing and organizing the object items into one or more organized groups or layers of object items. The associations created among the object items by the parsing engine 114 facilitate analysis and editing of the object items. Either during or after paring, the parsing engine 114 provides the object items to the object item interface 132 of the rendering processor 130, so that they may be rendered along with geospatial topology information as described above. In other embodiments, the parsed and organized object items may be provided by the parsing engine 114 directly to the rendering engine 136. Additionally, as necessary, the parsed and organized object items may be provided by the parsing engine 114 to the analysis/edit engine 116, to permit further analysis and editing of the parsed and organized object items. The analysis/edit engine 116 may also access the parsed and organized object items directly from the workspace memory 120, as necessary for analysis of the object items.

In certain aspects, the input interface 112 also accesses the local object feature database 150 and provides object item feature information to the parsing engine 114, so the parsing engine 114 is able to add and update features and attributes to object items from the object item listing database 152. The local object feature database 150 comprises a database of features and attributes which, in certain aspects, are to be associated or attributed to the object items from the object item listing database 152, either before or after parsing and organizing. As one example, the local object feature database 150 may comprise information related to buildings or dwellings, such as square footage, building age, and building materials. In that case, the local object feature database 150 may comprise information related to building or dwelling object items stored in the unstructured object item listing database 152. As another example with reference to FIG. 2, the local object feature database 150 may comprise information related to the lengths or types of trails or capacities of campsites. It is noted that the object items listed in the unstructured object item listing database 152 may already be stored along with certain feature and attribute information. In this context, the local object feature database 150 comprises additional feature and attribute information to be associated with the object items. In various embodiments, the local object feature database 150 may reside with or remote from the analysis processor 110 and the rendering processor 130.

In other aspects, the input interface 112 may also access the third party object feature server database 142 via the data network 140, to provide object item feature information to the parsing engine 114. The third party object feature server database 142 is similar to the local object feature database 150 in that it also comprises a database of features and attributes which, in certain aspects, are to be associated or attributed to the object items from the object item listing database 152. However, the third party feature server database 142 is remote from the analysis processor 110 and the rendering processor 130 and is accessed by the input interface 112 via the data network 140. In various embodiments, the data network 140 comprises one or more private or public networks or combinations thereof.

The output interface 118 is configured to output the parsed and organized object items, along with any associated or attributed features, for use by systems other than the system 100. In one embodiment, the output interface 118 is configured to output the parsed and organized object items as a particular filetype or filetype structure to be accessible by other systems or applications.

Figure 3:
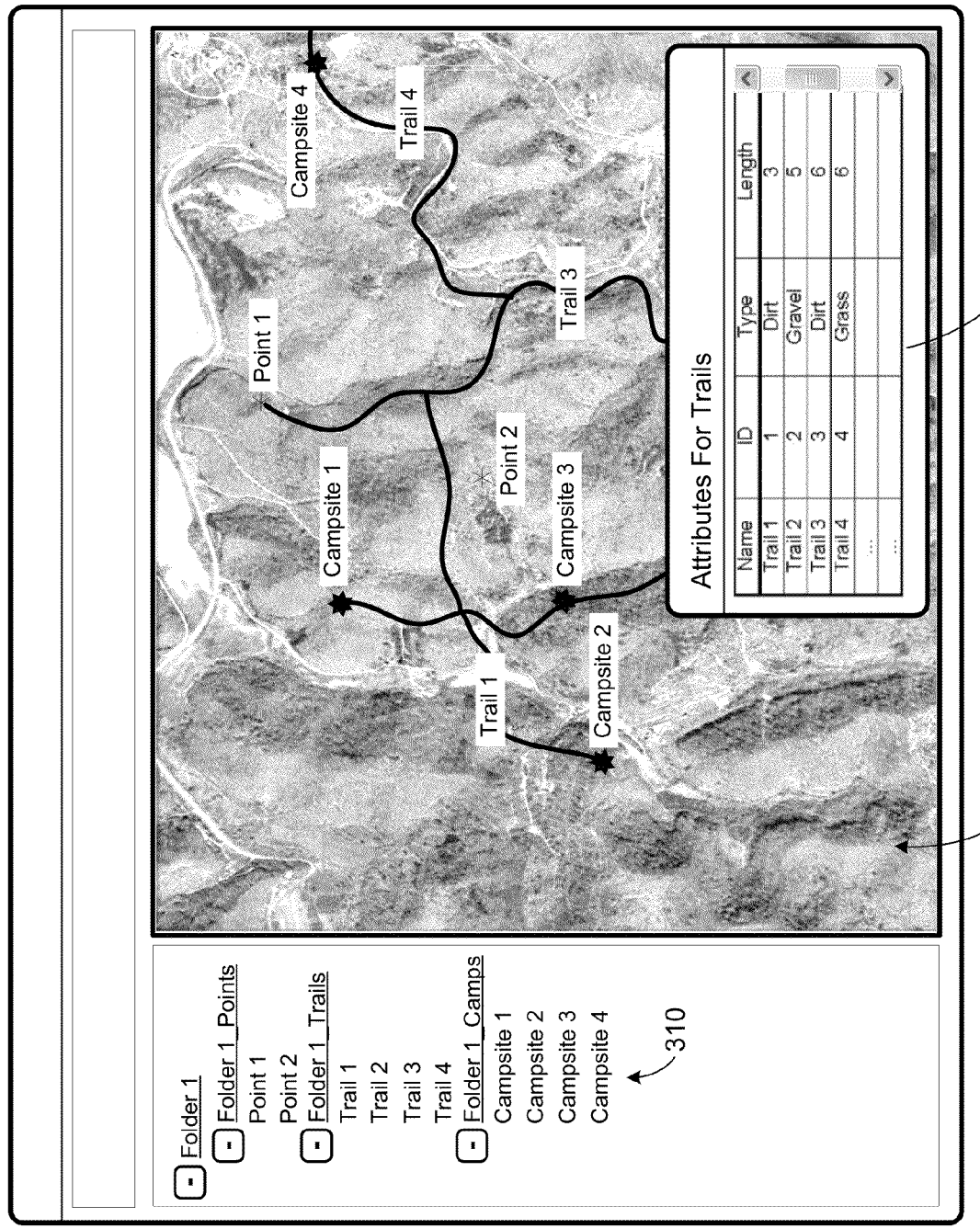
FIG. 3 illustrates another example display of geographic object items rendered in relation to geospatial topology information.

Turning to FIG. 3, another example illustration of a display of geographic object items rendered in relation to geospatial topology information is described. In FIG. 3, parsed geographic object items 310 are rendered in relation to geospatial topology information 320. Particularly, in the example of FIG. 3, the parsed geographic object items 310 include points, trails, and campsites organized by feature type into respective groups of feature-type folders by the parsing engine 114. It is noted that the data-structure organization including the use of feature-type folders, as illustrated in FIG. 3, is attributable to the processes performed by the parsing engine 114 and not to any structure stored in the unstructured object item listing database 152. It is also noted that the data-structure organization using feature-type folders in FIG. 3 is intended only as an example of an organized structure of object items which may be achieved by the parsing engine 114. Other types or forms of organization such as layers or other containers or constructs are within the scope of this disclosure.

As compared to the geographic object items 210 of FIG. 2, the parsed geographic object items 310 comprise an underlying organization which permits a user to perform additional analysis which could not be performed otherwise. For example, the user may be able to select every object item of a group of object items, edit, add, or delete an attribute for each object item of the group of object items simultaneously, sort each object item of the group of object items based on an attribute of the object items, set aspects of a theme for the group of object items, and search among attributes of the object items. Additional aspects of the underlying organization of the parsed geographic object items are illustrated by the attribute dialog box 330. The attribute dialog box 330 lists each object item in the "trails" group of object items, along with the attributes of each. As illustrated, each trail object item comprises a name, ID, type, and length attribute. The attribute dialog box 330 may be generated for display on the display 160 by the analysis/edit engine 116, in certain embodiments.

Using the attribute dialog box 330, a user can easily reference the attributes of the trails rendered in relation to the geospatial topology 320 and determine, for example, the longest trail. In certain embodiments, the attribute dialog box 330 may permit the user to sort the trails in ascending or descending order, for easy analysis. Similarly, the attribute dialog box 330 may permit the user to sort the trails according to name, ID, or type. As discussed above, one or more of the attributes of the trails may be determined by the analysis processor 110 based on information from the local object feature database 150 or the third party object feature database 142. In this manner, the analysis processor 110 provides additional information to users for analysis and evaluation that was not available in the unstructured object item listing database. Thus, the analysis processor 110 is configured to parse unstructured object items into one or more groups of structured object items and incorporate additional data among the groups of structured object items from various sources. In that context, the analysis processor 110 provides a type of GIS overlay for the rendering processor 130 in the system 100, giving users additional features not available using the rendering processor 130 and the unstructured object item listing database 152 alone.

Figure 4:
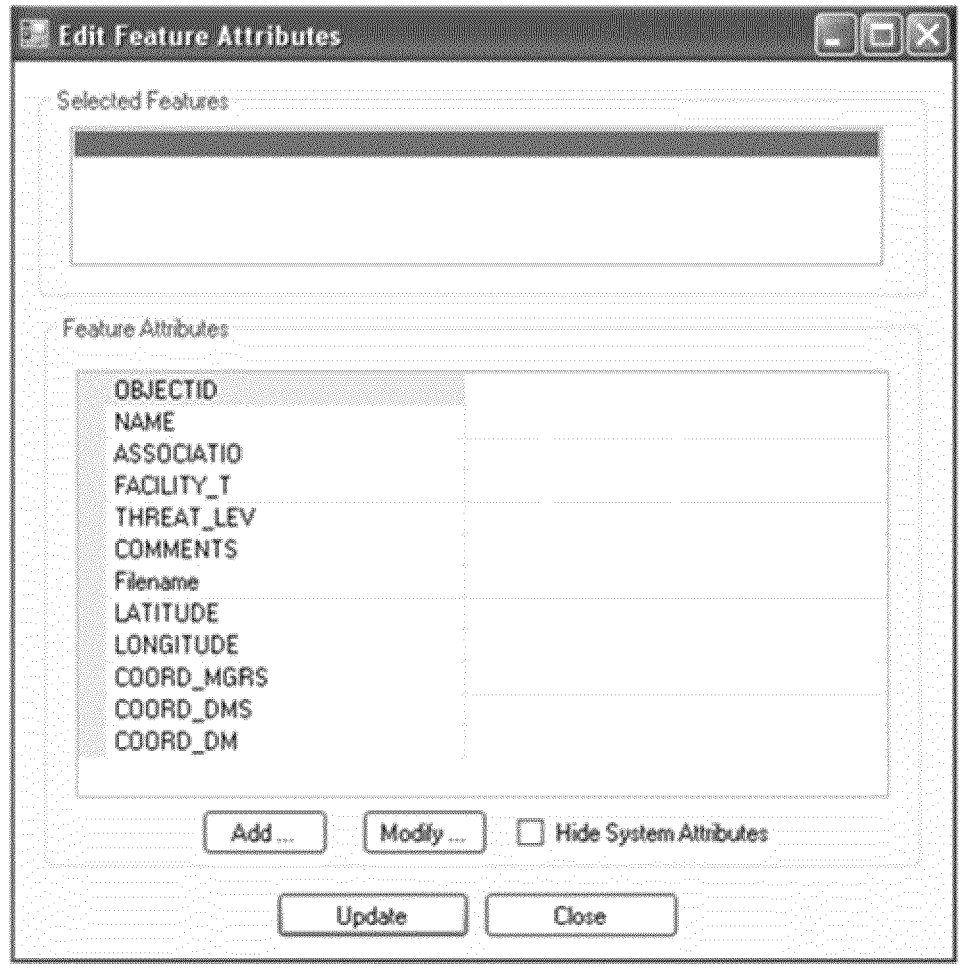
FIG. 4 illustrates an example of a dialog box for editing attributes and attribute data in a system for geographic data structuring and analysis.

The analysis/edit engine 116 may be configured to display additional dialog boxes for adding, deleting, and editing object items, adding, deleting, and editing attributes of object items, setting themes among object items, and for defining further structure among object items and attributes of object items. As such, additional dialog boxes, such as those illustrated in FIGS. 4-7, are within the scope of this disclosure. It is noted, however, that the dialog boxes illustrated in FIGS. 4-7 are provided by way of example only and other dialog boxes or manners of editing information in the system 100 are within the scope of this disclosure. FIG. 4 illustrates an example edit feature attributes dialog box displayed by the analysis/edit engine 116. In certain embodiments, the edit feature attributes dialog box may be displayed after selecting a particular object item, so that the attributes of the object item may be edited. In general, using the edit feature attributes dialog box, a user of the system 100 is able to edit values of attributes of object items.

Figure 5:
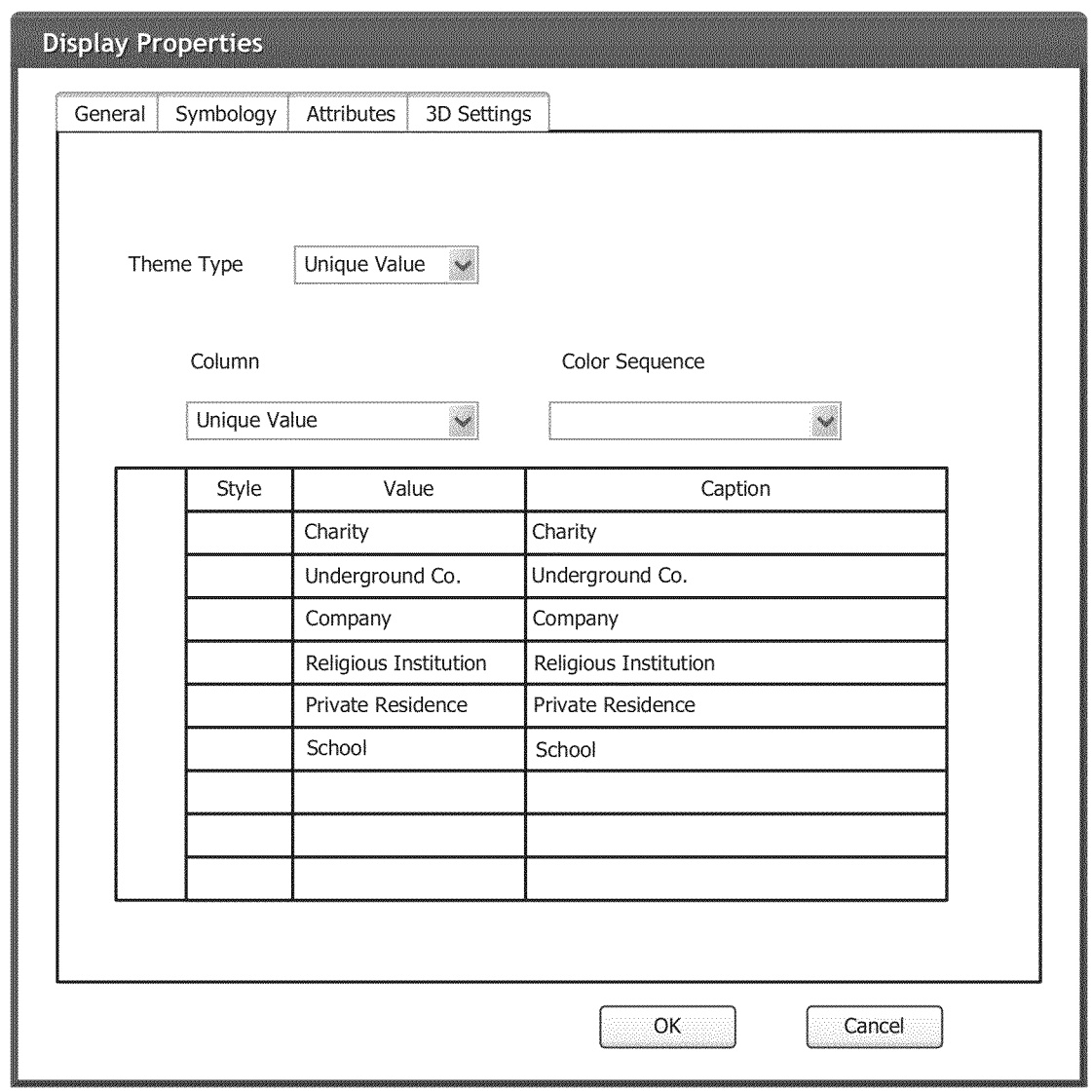
FIG. 5 illustrates an example of a dialog box for setting and editing layer attributes in a system for geographic data structuring and analysis.

The analysis/edit engine 116 may be configured to display a dialog box for setting properties of a group or layer of object items. FIG. 5 is an example of a dialog box for setting and editing layer attributes in this respect. As described herein, a "layer" of object items refers to a parsed group of object items. The group of object items may be associated by type (i.e., point, line, polygon, etc.) attribute, or schema during parsing, for example. As illustrated in FIG. 5, various color schemes and theme types may be selected for various aspects of a layer of object items. In this manner, when the object items of a layer are rendered by the rendering processor 130 in relation to geospatial topology information, the object items of the layer may be more easily distinguished from other unrelated object items in different layers.

Figure 6:
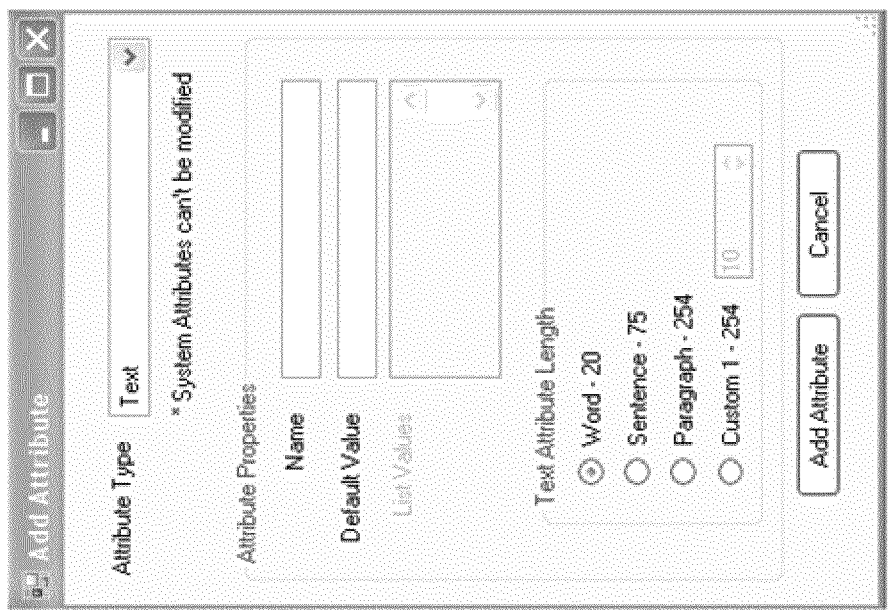
FIG. 6 illustrates an example of a dialog box for adding attributes in a system for geographic data structuring and analysis.

The analysis/edit engine 116 may be configured to display a dialog box for adding an attribute to an object item. FIG. 6 is an example of an add attribute dialog box. Using the add attribute dialog box, a user is able to add a new attribute for an object item, define a type of the attribute, and set a value for the attribute. Example types of attributes include numbers, text, time, and currency, without limitation. In one embodiment, the addition of a new attribute for one object item in a group of object items automatically adds the attribute for each object item of the group. In other embodiments, setting a value of an attribute for one object item in a group of object items automatically sets the value for the attribute to all object items in the same group.

Figure 7:
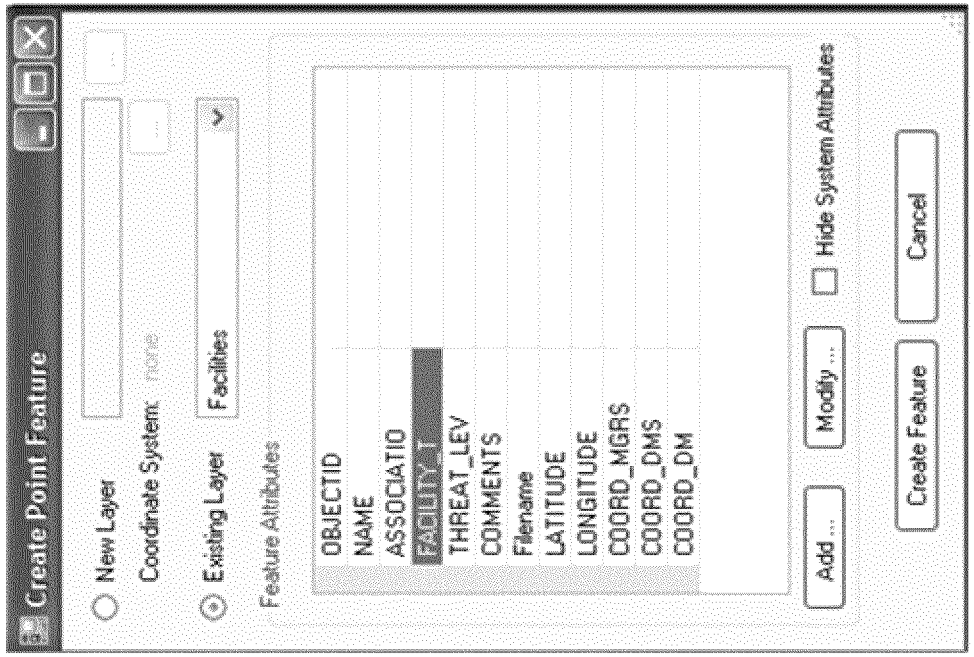
FIG. 7 illustrates an example of a dialog box for creating an object item in a system for geographic data structuring and analysis.

The analysis/edit engine 116 may be further configured to display a dialog box for adding a new object item. For example, FIG. 7 illustrates a dialog box for the addition of a new point. In certain embodiments, when the user adds a new object item to a group of object items, the analysis/edit engine 116 automatically creates the new object item having the same attributes of the other object items in the group. In FIG. 7, for example, a new point object item may be added to the group or layer "facilities" having the same attributes as the other points in the layer.

Figure 9:
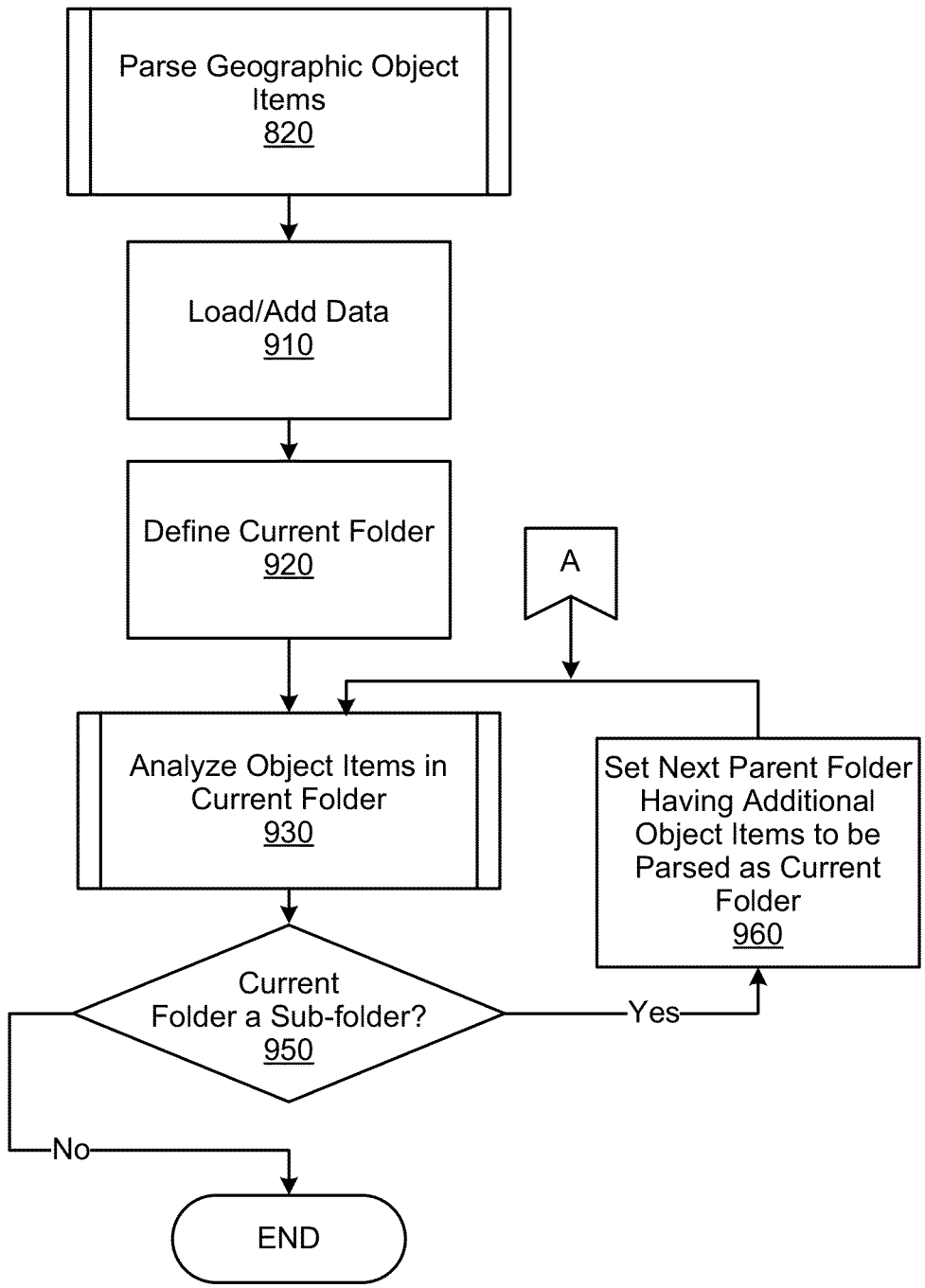
FIG. 9 illustrates an example embodiment of a method for parsing geographic object items.
Figure 10:
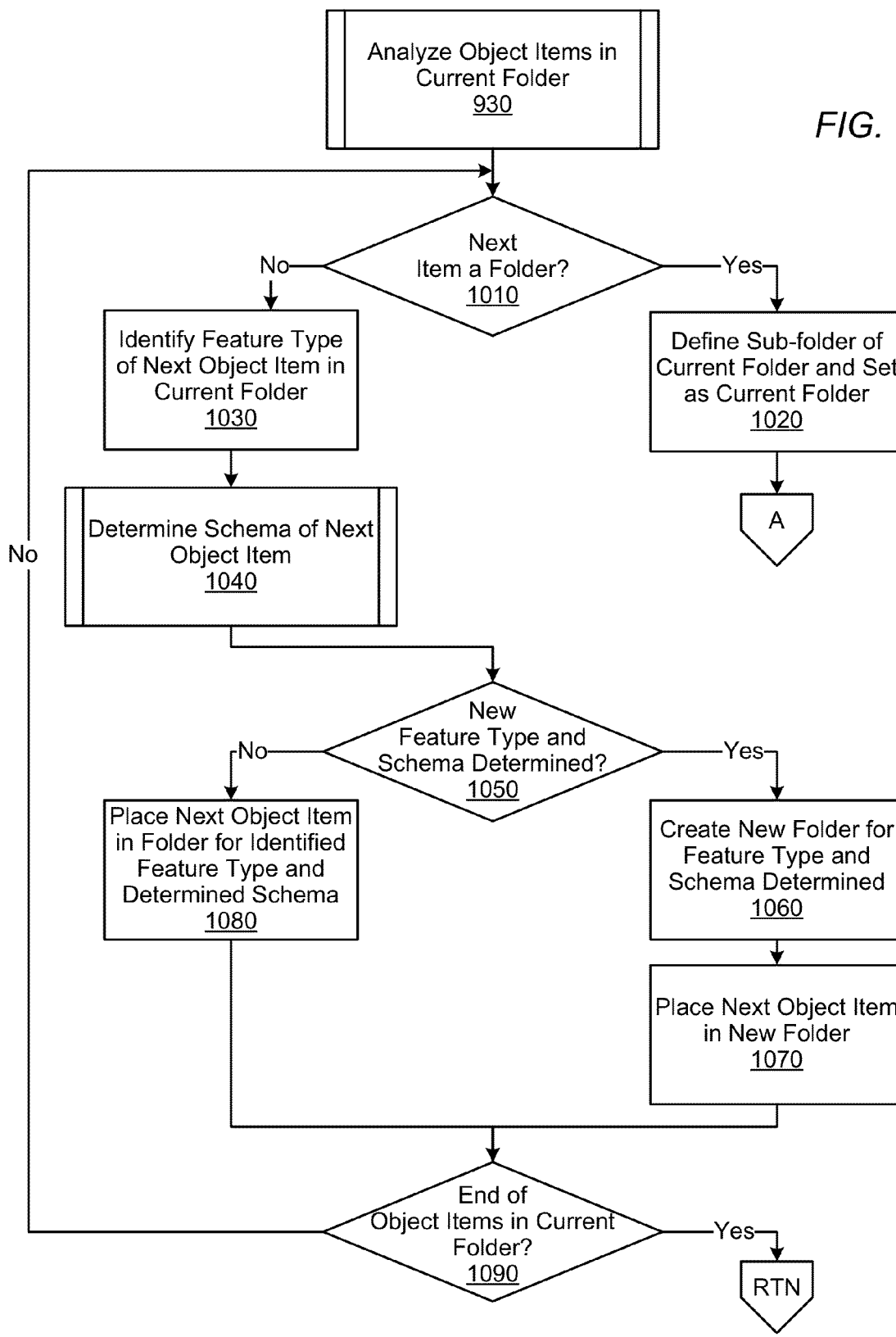
FIG. 10 illustrates an example embodiment of a method for analyzing object items.
Figure 11:
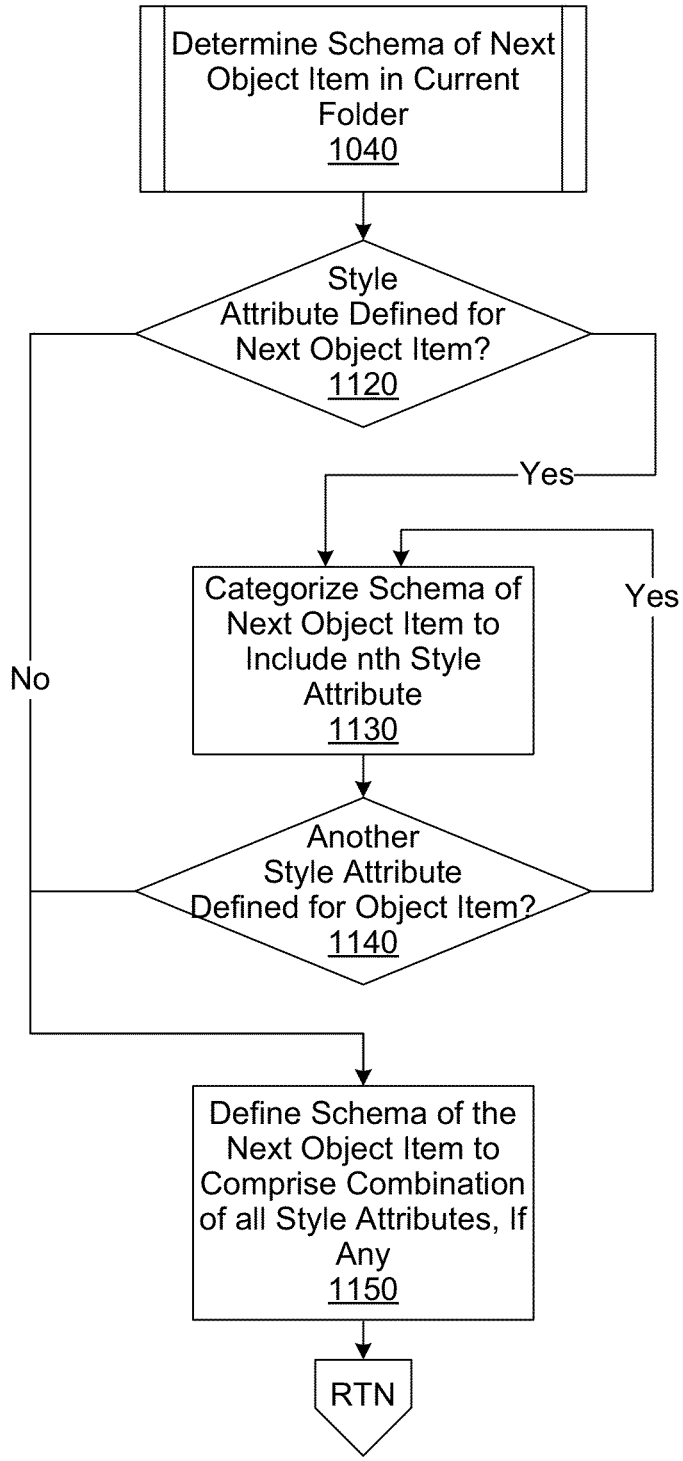
FIG. 11 illustrates an example embodiment of a method for determining a schema of an object item.

Additional operational aspects of the system 100 are described below with reference to the process flow diagrams of FIG. 9-11. Before turning to the process flow diagrams, it is noted that certain embodiments may be practiced using an alternative order of the steps illustrated in FIGS. 9-11. That is, the process flows illustrated in FIGS. 9-11 are provided as examples only, and certain embodiments may be practiced using process flows that differ from those illustrated. Additionally, it is noted that not all steps are required in every embodiment. In other words, one or more of the steps may be omitted or replaced, without departing from the spirit and scope of this disclosure. In alternative embodiments, steps may be performed in different orders, in parallel with one another, or omitted entirely, and/or certain additional steps may be performed without departing from the scope and spirit of this disclosure.

Figure 8:
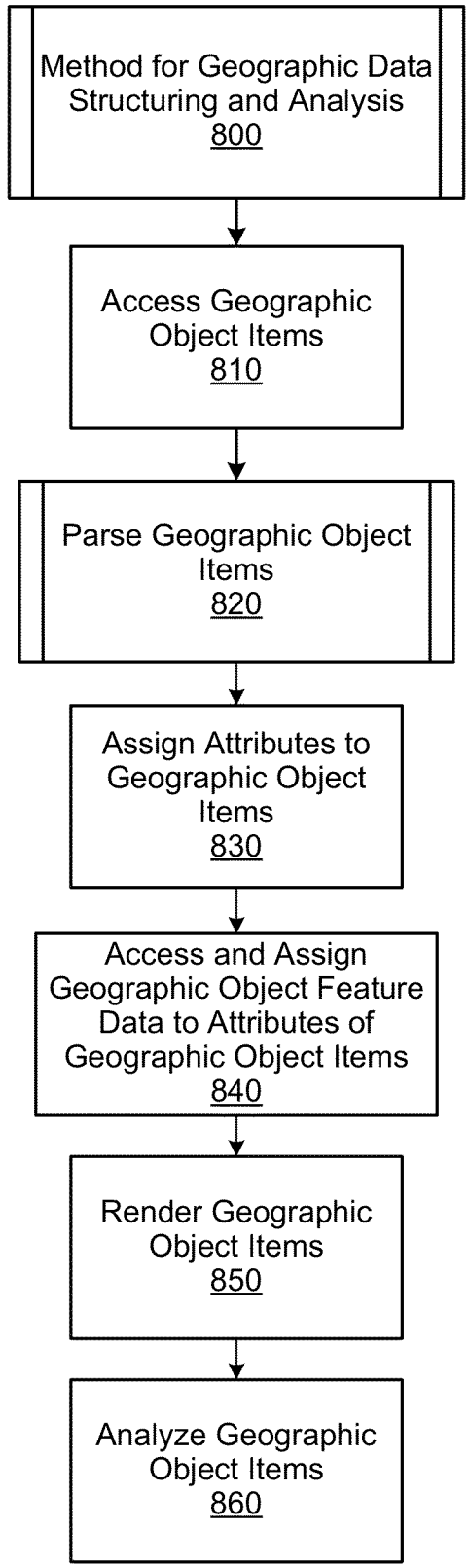
FIG. 8 illustrates an example embodiment of a method for geographic data structuring and analysis.

With reference to FIG. 8, a method for geographic data structuring and analysis 800 is described. The method 800 is generally described with reference to the system 100 of FIG. 1, although the method 800 may be implemented by systems other than the system 100. The method 800 begins at step 810, where the analysis processor 110 accesses a set of geographic objects and stores the set of geographic objects into a memory. For example, at step 810, the input interface 112 and the parsing engine 114 access the unstructured object item listing database 152 and store the geographic objects in the database 152 into the memory 120. As discussed above, the set of geographic objects listed in the database 152 are generally unstructured in form and may be in the format of a KML file, for example.

After the set of geographic objects are stored in the memory 120 at step 810, the process proceeds to step 820, where the geographic object items are parsed into one or more groups of geographic objects. That is, the parsing engine 114, having access to the memory 120, parses the geographic object items into one or more groups of geographic objects and, in certain embodiments, stores the parsed groups of geographic objects back to the memory 120. The step of parsing geographic object items is described in further detail below with reference to FIG. 9. Proceeding to step 830, attributes are assigned to the parsed geographic objects. The attributes may be assigned with reference to the third party and local object feature databases 142 and 150, for example. Among embodiments, the parsing engine 114 may assign one or more attributes to one or more of the parsed geographic objects. Additionally, the parsing engine 114 may assign one or more of the same attributes to each geographic object of a group of the geographic objects. It is noted that, at step 830, the parsing engine 114 may also assign values to the attributes when assigning them to the geographic objects. In that context, to determine the values of the assigned attributes, the parsing engine 114 may access the third party and local feature databases 142 and 150, as described above. It is noted that the assignment of attributes at step 830 may vary depending upon the application and several other factors such as the type of geographic object the attribute is assigned to, the amount of data stored in the third party and local feature databases 142 and 150, and the type of analysis to be performed.

At this point in the method 800, the unstructured geographic objects listed in the database 152 have been parsed into groups having certain formatting, structure, and associations to assist with analysis or editing. Additionally, the geographic objects have also been assigned additional attributes for analysis or editing, as necessary for the application or analysis desired. As noted above, the values of the additional attributes may be determined from local or third party databases in cases where the values are not available in the unstructured object item listing database 152.

Proceeding to step 850, the parsed geographic objects stored in the workspace memory 120 are rendered by the rendering processor 130. That is, at step 850, the rendering processor 130 renders one or more of the parsed geographic objects in relation to geospatial topology information. In one embodiment, the parsed geographic objects are provided to the object input interface 132 by the parsing engine 114. In other embodiments, the object input interface 132 may retrieve the parsed geographic objects directly from the workspace memory 120. In a manner similar to that discussed above, at step 850, the rendering engine 136 renders the parsed geographic objects in relation to the geospatial topology data stored in the geospatial topography database 154. As such, the rendered output may appear on the display 160 in a manner similar to that illustrated in FIG. 3. Particularly, in certain aspects, the geographic objects are rendered using groups having certain formatting, structure, and associations to assist with analysis or editing.

Proceeding to step 860, the rendered geographic objects may be analyzed based on the rendered display of the objects and one or more of the attributes of the rendered geographic objects. For example, at step 860, a user may be able to select every object item of a group of object items, edit, add, or delete an attribute for each object item of the group of object items simultaneously, sort each object item of the group of object items based on an attribute of the object items, set aspects of a theme for the group of object items, and search among attributes of the object items. In certain embodiments, the analysis at step 860 may be performed using one or more dialog boxes generated by the analysis/edit engine 116 and displayed on the display 160 as discussed above.

Turning to FIG. 9, an example of parsing geographic object items at step 820 is described in further detail. It is noted that the embodiment described with reference to FIG. 9 is provided by way of example only. In other words, the formatting and structure provided by the process in FIG. 9 is presented as an example of one type of formatting and structure that may be provided to unstructured object items. Starting at step 910, geographic object items are loaded, added, or stored to the workspace memory 120 from the unstructured object item listing database 152 using the input interface 112 and, in some embodiments, the parsing engine 114. It is noted that step 910 may be omitted in some embodiments if the geographic object items have been previously stored to the workspace memory 120. For example, step 910 may be omitted if the geographic object items were previously stored to the workspace memory 120 in step 810 of FIG. 8.

Figure 12:
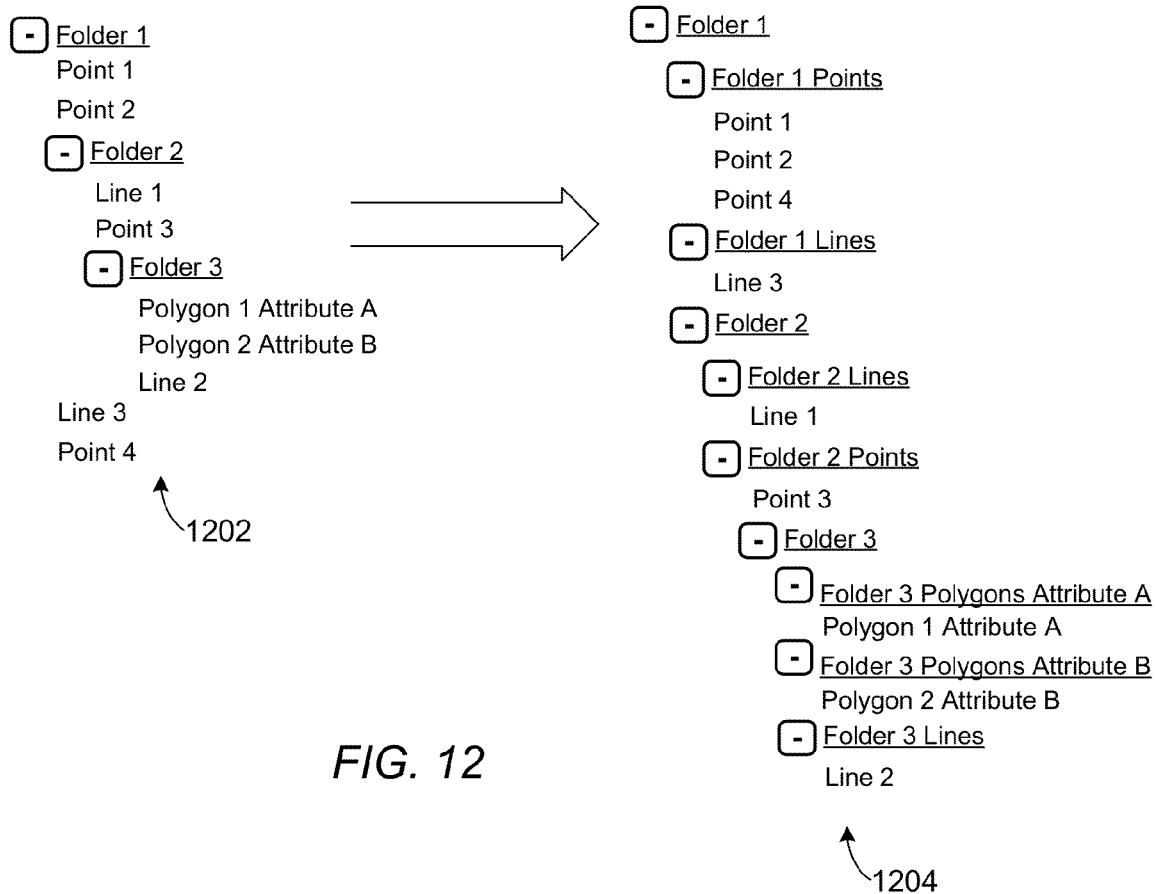
FIG. 12 illustrates an example of geographic object items parsed by the methods of FIGS. 9-11.

Proceeding to step 920, the parsing engine 114 defines a current folder. For example, making reference to FIG. 12 for additional context, the parsing engine 114 accesses the unstructured geographic object items 1202 stored in the workspace memory 120 at step 920 and, when the object items are stored in one or more folders, defines a current folder for the items. It is noted that, in various embodiments, the geographic objects stored in the unstructured geographic object item listing database 152 may be provided "containers" other than folders, such as layers or documents. In FIG. 12, the unstructured geographic object items 1202 are stored and arranged in the folders "Folder 1," "Folder 2," and "Folder 3." It is further noted, however, that the folders fail to arrange the unstructured geographic object items 1202 into any particular arrangement suitable for analysis of the object items. In other words, the unstructured geographic object items 1202 are stored in the folders "Folder 1," "Folder 2," and "Folder 3" arbitrarily and without any useful or meaningful arrangement. In other embodiments, the folders "Folder 1," "Folder 2," and "Folder 3" may comprise equivalent containers other than "folders," depending upon the format of the unstructured object item listing database 152. Based on the listing of unstructured geographic object items 1202 in FIG. 12, the parsing engine 114 defines the current folder as "Folder 1" at step 920, operating on the unstructured geographic object items 1202 from the top down. In some cases, the unstructured geographic object items 1202 may not be organized in any folders at all. In this case, step 920 may be skipped or omitted.

After defining the current folder as "Folder 1" at step 920, the process proceeds to step 930 where the object items in the current folder are analyzed. The analysis at step 930 is described in additional detail with reference to FIG. 10. Turning to FIG. 10 for an example process of analyzing object items in the current folder, the parsing engine 114 determines at step 1010 whether the next item in the unstructured geographic object items 1202 is a folder. With reference to FIG. 12, the parsing engine 114 determines that the next item in the unstructured geographic object items 1202 is not a folder, because the next item "Point 1" is a point and not a folder. As such, the parsing engine proceeds to step 1030 where the feature type of the next object item is determined by the parsing engine 114. With reference again to FIG. 12, the feature type of the next object item "Point 1" is a "point." In FIG. 12, it is noted that three types of object features are illustrated, including points, lines, and polygons. However, other feature types are within the scope of the present disclosure. Alternatively, if the parsing engine 114 determined at step 1010 that the next item in the current folder is another folder, the parsing engine 114 would proceed to step 1020 where it would define a sub-folder of the current folder, set that sub-folder as the current folder, and return to step 930 of FIG. 9.

After the parsing engine 114 determines the feature type of the next object item at step 1030, the process proceeds to step 1040 where the schema of the next object item is determined. The process of determining the schema of the next object item at step 1040 is described in further detail with reference to FIG. 11. In general, the schema of an object item may be defined by the style attributes of the object item. For example, an object item defined to be displayed in a first color may be determined to have a different schema than an object item defined to be displayed in a second color. It is noted, however, that style attributes may comprise attributes other than color such as size and orientation, among others.

Turning to FIG. 11 for an example process of determining the schema of the next object item, the process begins at step 1120, where the parsing engine 114 determines whether a style attribute is defined for the next object item. That is, the parsing engine 114 analyzes the next object item at step 1120 to determine if it includes any defined styles. For example, the object item "Point 1" may be defined, in various aspects, to have a certain color, size, shape, or orientation style attribute.

If the next object item is determined by the parsing engine 114 to have a style attribute at step 1120, the process proceeds to step 1130 where the parsing engine 114 categorizes the schema of the next object item to include the $n^{th}$ style attribute determined in step 1120. After step 1130, the process proceeds to step 1140, where the parsing engine 114 determines whether another style attribute is defined for the next object item. If so, the process proceeds again to step 1130, so that the schema for the next object item can be categorized to further include the $n^{th}$ style attribute determined in step 1140. In this context, it is noted that any object item may be defined by one or more style attributes. After the schema of the next object item is categorized to include all style attributes of the next object item at steps 1120, 1130, and 1140, the process proceeds to step 1150, where the parsing engine 114 defines the overall schema of the next object item to comprise a combination of all determined style attributes of the next object item. After step 1150, the process 1040 returns to the previous process.

It is noted that, an object item may not be defined by any style attributes. In this case, the process 1040 proceeds directly to step 1150 after the parsing engine 114 determines at step 1120 that no style attribute is defined for the next object item. For the object item "Point 1" of FIG. 12, no style attribute is defined, and the parsing engine 114 proceeds to step 1150 where the schema of the next object item is defined to include no attributes. After step 1150, the process 1040 returns to step 1050 of FIG. 10.

At step 1050 of FIG. 10, the parsing engine 114 determines whether a new schema was determined at step 1040 for the feature type of the object item determined at step 1030. That is, the parsing engine 114 determines whether a new schema was determined for the object item "Point 1" at step 1050. In the context of the example of FIG. 12, because "Point 1" is the first object item in "Folder 1," the schema for "Point 1" determined at step 1040 is new. That is, the schema of "Point 1," which was categorized to include no style attributes, is new because no points were previously determined having no style attributes. Because the schema for the object item "Point 1" is new, the process proceeds to step 1060, where the parsing engine 114 creates a new "Point" folder for points having schemas categorized with no style attributes. With reference to FIG. 12, this new folder is illustrated as "Folder 1 Points." Proceeding to step 1070, the parsing engine 114 places the object item "Point 1" in the "Folder 1 Points" folder.

After step 1070, the process proceeds to step 1090, where the parsing engine 114 determines whether it has reached the end of the object items in the current folder. With reference to FIG. 12, because the object item "Point 2" is also within "Folder 1," the process proceeds back to steps 1010, 1030, and 1040, where the parsing engine 114 determines the feature type and schema of the object item "Point 2." In the example of FIG. 12, the object item "Point 2" also has no defined style attributes. As such, the schema of the object item "Point 2" is determined and defined to comprise no style attributes at step 1040. Proceeding to step 1050, the parsing engine 114 determines that the schema for the object item "Point 2" is not new for the feature type "point," because the object item "Point 1" was also determined to comprise a point with no style attributes. As such, the process proceeds to step 1080, where the parsing engine 114 places the object item "Point 2" into the folder for points having no style attributes, "Folder 1 Points," as illustrated in FIG. 12.

After the parsing engine 114 places the object item "Point 2" into the "Folder 1 Points" folder at step 1080, the process proceeds again to step 1090 where the parsing engine 114 determines whether it has reached the end of the object items in the current folder. Referring to FIG. 12, after the "Point 1" and "Point 2" object items, the "Folder 1" folder includes the "Folder 2" folder. As such, the process proceeds back to steps 1010 and 1020 to define the "Folder 2" subfolder of the "Folder 1" folder, as illustrated in FIGS. 10 and 12. After step 1020, the process proceeds back to step 930 of FIG. 9, and returns back to step 1010 of FIG. 10, for parsing the object items "Line 1" and "Point 3" in the "Folder 2" sub-folder. It is noted that the object items "Line 3" and "Point 4" are still present in the "Folder 1" folder and are parsed later in the process as described below.

The object items "Line 1" and "Point 3" are parsed by the parsing engine 114 in a manner similar to that described above with reference to the object items "Point 1" and "Point 2." Particularly, for the "Line 1" object item, the parsing engine 114 identifies the feature type of the "Line 1" object as a "line" at step 1030, determines that the "Line 1" object item has no defined style attributes at step 1040, determines that a new schema and feature type combination is associated with the "Line 1" object item at step 1050, creates a new "Folder 2 Lines" folder for the new schema and feature type combination at step 1060, and places the "Line 1" object item into the new "Folder 2 Lines" folder at step 1070. Similarly, for the "Point 3" object item, the parsing engine 114 identifies the feature type of the "Point 3" object as a "point" at step 1030, determines that the "Point 3" object item has no defined style attributes at step 1040, determines that a new schema and feature type combination is associated with the "Point 3" object item at step 1050, creates a new "Folder 2 Points" folder for the new schema and feature type combination at step 1060, and places the "Point 3" object item into the new "Folder 2 Points" folder at step 1070. It is noted that, as illustrated in FIG. 12, the new "Folder 2," "Folder 2 Lines," and "Folder 2 Points" folders are created by the parsing engine 114 within the "Folder 1" folder. In other embodiments, sub-folders may not be parsed to be within the parent folder they are originally found within. In alternative embodiments, for example, any general organization among unstructured object items, such as folders, may be completely omitted during parsing, to create only a set of parent folders or layers for new schema and feature type combinations.

After the parsing engine 114 parses the "Line 1" and "Point 3" object items, the process proceeds again to step 1090 where the parsing engine 114 determines whether it has reached the end of the object items in the current folder. Referring to FIG. 12, after the "Line 1" and "Point 3" object items, the "Folder 2" folder includes the "Folder 3" folder. As such, the process proceeds back to steps 1010 and 1020 to define the "Folder 3" subfolder of the "Folder 2" folder, as illustrated in FIGS. 10 and 12. After step 1020, the process proceeds back to step 930 of FIG. 9, and returns back to step 1010 of FIG. 10, for parsing the object items "Polygon 1 Attribute A," "Polygon 1 Attribute B," and "Line 2" in the "Folder 3" sub-folder.

The object items "Polygon 1 Attribute A," "Polygon 1 Attribute B," and "Line 2" in the "Folder 3" sub-folder are parsed by the parsing engine 114 in a manner similar to that described above for the other object items. However, it is noted that, although the object items "Polygon 1 Attribute A" and "Polygon 1 Attribute B" are both of the same "polygon" feature type, each has a different schema as determined at step 1040. That is, the attribute A of "Polygon 1" is different than the attribute B of "Polygon 2." As such, the parsing engine determines a new schema and feature type combination for each at step 1050 and creates separate folders for each at step 1060, as also illustrated in FIG. 12.

After the parsing engine 114 parses the object items within the "Folder 3" subfolder, the process proceeds again to step 1090 where the parsing engine 114 determines whether it has reached the end of the object items in the current folder. Referring to FIG. 12, the "Folder 3" sub-folder does not include any additional object items after the "Line 2" object item. As such, the process proceeds along the "YES" branch after step 1090 and returns to step 950 of FIG. 9. At step 950, because the current folder "Folder 3" is a sub-folder of "Folder 2," the process proceeds to step 960, where the parsing engine 114 sets the next parent folder having additional object items to be parsed as the current folder. Here, because the "Folder 2" parent folder of the "Folder 3" subfolder has no object items remaining to be parsed as illustrated in FIG. 12, the parsing engine 114 sets the "Folder 1" folder as the next parent folder. The process then proceeds again to step 930 to analyze the remaining "Line 3" and "Point 4" object items as illustrated in FIG. 12. The object items "Line 3" and "Point 4" are parsed by the parsing engine 114 in a manner similar to that described above for the other object items. Particularly, the "Line 3" object item is placed within the "Folder 1 Lines" folder at step 1080, and the "Point 4" object item is placed within the "Folder 1 Points" folder at step 1080.

It is again noted that the method 820 for parsing geographic object items is provided as an example of organizing geographic object items, and other processes are within the scope of this disclosure. Similarly, the unstructured object items 1202 are provided as a non-limiting example of object items which may be parsed by the method 820. The parsed geographic object items 1204 of FIG. 12 are formed into groups or folders which are more suitable for analysis. For instance, because all points in a folder are grouped together, a user may be able to quickly select all points in a folder and add or edit attributes to the points. Similarly, the user may be able to sort all points in the folder according to the values of the attributes of the points, as discussed above. As such, the user is able perform additional analysis on rendered object items that would not otherwise be possible without first parsing the object items.

Figure 13:
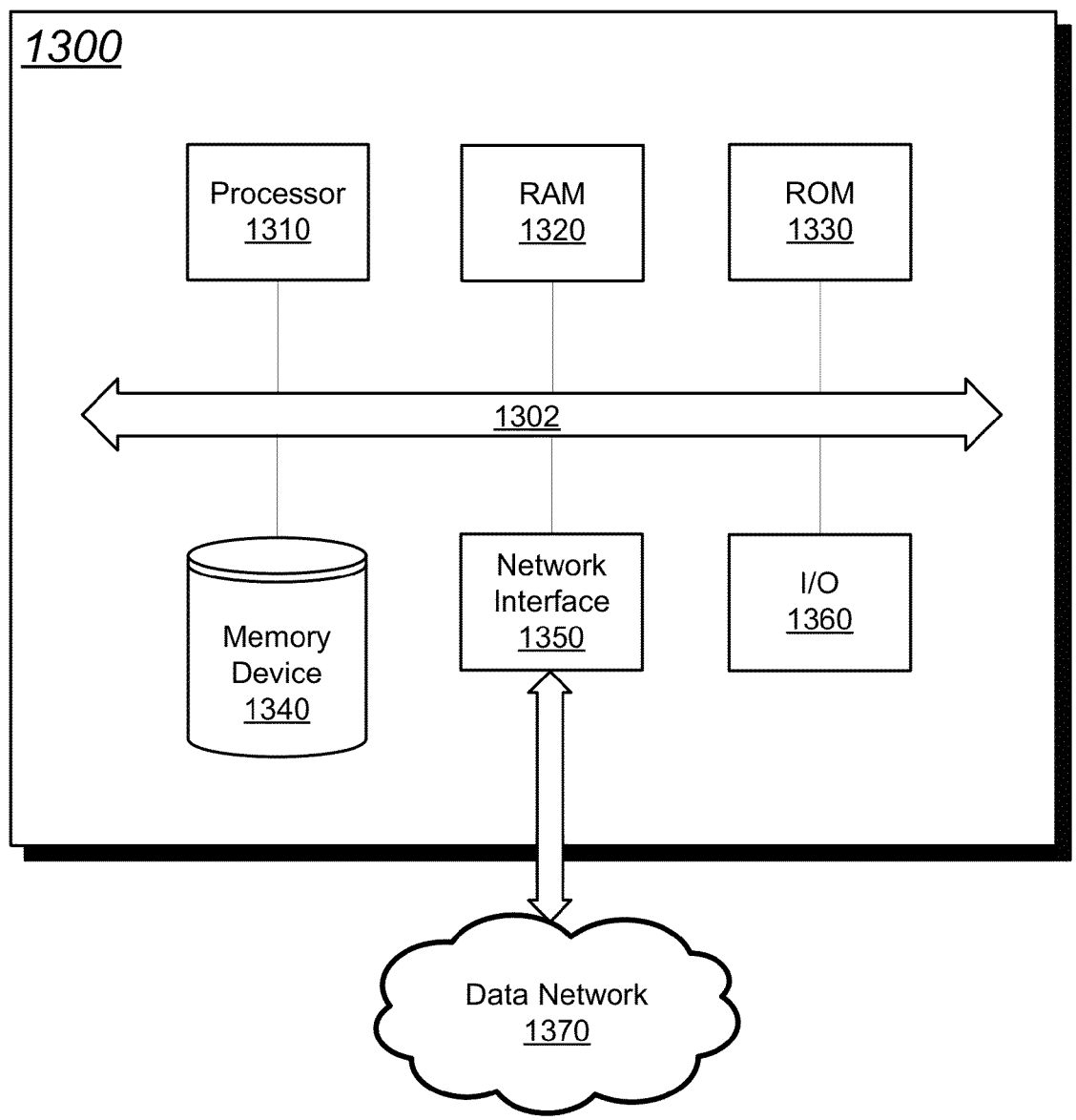
FIG. 13 illustrates an example hardware diagram of a general purpose computer.

Turning to FIG. 13, an example hardware diagram of a general purpose computer 1300 is illustrated. In certain embodiments, the system 100 may be implemented, at least in part, using one or more elements of the general purpose computer 1300. The computer 1300 includes a processor 1310, a Random Access Memory ("RAM") 1320, a Read Only Memory ("ROM") 1330, a memory device 1340, a network interface 1350, and an Input Output ("I/O") interface 1360. The elements of the computer 1300 are communicatively coupled via a bus 1302.

The processor 1310 comprises any well known general purpose arithmetic processor or Application Specific Integrated Circuit ("ASIC"). The RAM and ROM 1320 and 1330 comprise any well known random access or read only memory device that stores computer-readable instructions to be executed by the processor 1310. The memory device 1330 stores computer-readable instructions thereon that, when executed by the processor 1310, direct the processor 1310 to execute various aspects of the embodiments described herein. When the processor 1310 comprises an ASIC, the processes described herein may be executed by the ASIC according to an embedded circuitry design of the ASIC, by firmware of the ASIC, or both an embedded circuitry design and firmware of the ASIC. As a non-limiting example group, the memory device 1330 comprises one or more of an optical disc, a magnetic disc, a semiconductor memory (i.e., a flash based memory), a magnetic tape memory, a removable memory, combinations thereof, or any other known memory means for storing computer-readable instructions. The network interface 1350 comprises hardware circuitry interfaces to communicate over data networks, such as the data network 1370. The I/O interface 1360 comprises device input and output interfaces such as keyboard, pointing device, display, communication, and other interfaces. The bus 1202 electrically and communicatively couples the processor 1310, the RAM 1320, the ROM 1330, the memory device 1340, the network interface 1350, and the I/O interface 1360, so that data and instructions may be communicated among them. In operation, the processor 1310 is configured to retrieve computer-readable instructions stored on the memory device 1340, the RAM 1320, the ROM 1330, or another storage means, and copy the computer-readable instructions to the RAM 1320 or the ROM 1330 for execution. The processor 1310 is further configured to execute the computer-readable instructions to implement various aspects and features of the methods and processes described above. For example, the processor 1310 may be adapted and configured to execute the processes described above with reference to FIGS. 9-11, including the processes described as being performed by the parsing engine 114.

While embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

The invention claimed is:

1. A method for geographic data structuring and analysis and rendering thereof in relation to a geospatial topology, comprising:
   accessing by a geospatial rendering input interface the geospatial topology from a geospatial topology database and providing the geospatial topology to a rendering engine;
   accessing by an object input interface a set of unstructured geographic objects from an unstructured geographic object database;
   storing the set of unstructured geographic objects into a memory;
   parsing, by a parsing engine, the set of unstructured geographic objects into groups of parsed geographic objects, wherein parsing the set of unstructured geographic objects comprises the steps of:
      defining a current folder,
      analyzing object items in the current folder,
      when each object item in the current folder has been analyzed, determining whether the current folder is a sub-folder, and
      when the current folder is a sub-folder, setting a parent folder as a current folder;
   assigning one or more attributes to each of the parsed geographic objects, comprising for each group of geographic object, assigning a same set of attributes to each geographic object of the group of geographic objects;
   accessing a database of geographic object feature data and assigning one or more features of the geographic object feature data to one or more attributes of each of the parsed geographic objects;
   rendering by a rendering processor one or more of the parsed geographic objects in relation to the geospatial topology;
   displaying the rendering of the one or more parsed geographic objects in relation to the geospatial topology; and
   analyzing the rendered geographic objects based on at least one assigned attribute of the geographic objects, wherein the analyzing includes:
   facilitating selection of a group of rendered geographic objects having a commonly assigned at least one attribute; and
   facilitating at least one of the following actions with respect to the selected group:
      editing an attribute for each geographic object in the selected group,
      sorting of each geographic object in the selected group based on an attribute thereof, and
      searching among attributes of the geographic objects in the selected group.

2. The method of claim 1 further comprising adding a new geographic object to a group of the geographic objects, the new geographic object inheriting the same attributes assigned to each geographic object of the group of geographic objects.

3. The method of claim 1, further comprising displaying a dialog box for editing a value of an attribute of the geographic objects.

4. The method of claim 1, wherein analyzing the rendered geographic objects comprises sorting the rendered geographic object items according to respective values of an attribute of each of the rendered geographic objects.

5. The method of claim 1, wherein analyzing the rendered geographic objects comprises querying the rendered geographic object items based on the attributes of the rendered geographic object items.

6. The method of claim 1, wherein rendering one or more of the geographic objects comprises rendering based on respective values of the attributes of the geographic objects.

7. The method of claim 1, wherein analyzing the object items in the current folder comprises the steps of:
   identifying a feature type of the next object item in the current folder;
   determining a schema of the next object item in the current folder;
   determining whether a combination of the feature type and schema of the next object item is a new combination for the current folder; and
   placing the next object item into a new folder when the combination of the feature type and the schema of the next object item is new.

8. The method of claim 7, wherein determining a schema of the next object item in the current folder comprises the steps of:
   determining each style of the next object item; and
   defining the schema of the next object item to include a combination of each style of the next object item.

* * * * *